United States Patent [19]

Frazier

[11] 4,429,981

[45] Feb. 7, 1984

[54] TANK APPARATUS WITH FLOATING AGITATOR FOR PROCESSING PHOTOGRAPHIC FILM

[76] Inventor: William J. Frazier, 4739 Lighthouse Rd., Orlando, Fla. 32808

[21] Appl. No.: 425,660

[22] Filed: Sep. 28, 1982

[51] Int. Cl.[3] .............. G03B 3/04

[52] U.S. Cl. .............. 354/316; 354/328; 354/331

[58] Field of Search .............. 354/312, 313, 316, 323, 354/328, 324, 327, 331; 366/100

[56] References Cited

U.S. PATENT DOCUMENTS

| | | | |
|---|---|---|---|
| 2,829,575 | 4/1958 | Collins | 354/311 |
| 3,886,575 | 9/1973 | Gall | 354/311 |
| 4,001,852 | 1/1977 | Gall | 354/313 |
| 4,291,968 | 9/1981 | Work | 354/313 |

FOREIGN PATENT DOCUMENTS

| | | | |
|---|---|---|---|
| 165019 | 6/1949 | Austria | 354/312 |
| 691800 | 10/1979 | U.S.S.R. | 354/312 |

*Primary Examiner*—A. A. Mathews

[57] ABSTRACT

This invention relates to apparatus for processing photographic film, and more specifically, to a tank apparatus which is used to house the film during the processing cycle.

The tank is provided with an opening at the bottom portion which functions to admit chemical processing solution to the interior so that the solution contacts the film. The opening is almost completely covered by a plate positioned within the tank, the plate being configured so that the solution passes upwardly into the tank at the periphery of the plate. The plate is part of a floating agitator device which carries the film and is movable within the tank between a first position and a second position. The agitator device is moved between positions by a lever arm, plunger rod or the like which is accessible from the exterior of the tank. In operation, the tank is submerged into a chemical solution in a vessel, the solution enters the tank and covers the film, the film is reciprocally moved by activating the floating agitator, and the tank is withdrawn and placed in a second vessel. The cycle is then repeated.

6 Claims, 4 Drawing Figures

TANK APPARATUS WITH FLOATING AGITATOR FOR PROCESSING PHOTOGRAPHIC FILM

FIELD OF THE INVENTION

This invention relates to an apparatus for use in developing photographic film, and more specifically, to a tank apparatus which holds the film as it is processed through several chemical solutions and washing bath.

BACKGROUND OF THE INVENTION

There currently exists many devices for processing and developing photographic film. These devices range from elaborate, computer controlled automatic equipment to simple containers for use by the amateur photographer in a residential dark room. The more elaborate equipment is generally not available for a small photographic operation because of its expense and size. Thus, the amateur or portrait photographer must use simple, inexpensive equipment.

Despite many improvements over the years, the basic equipment most frequently employed requires the photographer to agitate the film by picking the tank up and inverting it several times. Invariably, the skin irritating chemicals seep around the edges of tank's cover.

Chemical and rinse water solutions must be poured in and out of these tanks as many as ten or more times when color films are being processed. Then the film is washed in water at a suitable temperature. Obviously, chemical contact with the skin is an ever present hazard, particularly under such difficult circumstances. Prior art advances such as described in U.S. Pat. Nos. 2,829,575 and 3,886,575 reduce such dangers by the use of casettes or closed containers which house the film and allow the developer to immerse the film in successive baths of chemical solutions. However, these devices are complex structures which are difficult to manufacture and do not provide a simple means for agitating the film while in solution.

It is therefore a primary object of this invention to provide a tank apparatus for housing a photographic film during processing which is simple and inexpensive to manufacture and which permits even development of the film without the need of a dark room environment after loading of the film.

It is another major object of this invention to provide a tank apparatus of this type which is structured to allow for efficient and rapid agitation of the film contained therein during processing.

SUMMARY OF THE INVENTION

The objects of this invention are attained by a simple but effective tank apparatus which houses the film during processing. The tank apparatus includes a container which forms an enclosure having open upper and lower ends. The open upper end permits access to the interior of the container so that the film may be placed therein and is closed by a cover prior to processing. The cover, which may be removably attached to the container by any convenient means such as a threaded fit or slidable dovetail joint, is provided with several openings to permit access of air. These openings also allow a water solution to pass out of the container when the film is washed as a final step. The open lower end is substantially blocked by the lower plate of an agitator device positioned within the container. This lower plate has a width or diameter which is slightly less than that of the inside portion of the container, thus forming a continuous opening around its periphery. This continuous opening is the means by which a chemical solution enters the interior of the container when the tank apparatus is immersed in the solution. A baffle projects inwardly from the inside wall of the container and is positioned just above the lower plate to prevent light from entering the container and also acts as an impediment for further upward travel of the agitator device.

The agitator device is positioned within the container but is unattached to any part of it. Thus, the agitator device is free floating, and may move upwardly or downwardly upon the application of some pressure. The film is operatively connected to the agitator device so that it moves with it during operation. This construction permits easy movement of the film while the container is immersed in the chemical solution without the necessity of moving the container. Because the film is housed within the container during such movement, splashing of the chemical solution occurs only within the container and contact with the skin is avoided despite sometimes rapid and vigorous agitation. Such agitation results in an even development and is an important advantage of the present invention.

The free floating feature of the agitator device is a function of its construction. This device is preferably a unitary piece consisting of the lower plate described above, an upper plate structured similarly and displaced from the lower plate and a central, generally elongated member to which both plates are connected. The upper plate is positioned above the baffle on the container and interferes with it during downward movement of the device. Thus the distance that the agitator device may move is defined by the distance between the upper and lower plates. This distance may be adjusted by the use of spacer lugs projecting upwardly or downwardly from either plate. These spacer lugs also permit the exit of the solutions by maintaining an opening between the surfaces of the light baffle and the agitator plates. The elongated central member is adapted to directly receive a film spool or to have a receiving means, such as a basket, connected to it.

An activating force may be applied to the agitator device in any number of ways. The preferred embodiment of this invention includes the use of a movable arm which is positioned proximate the agitator device so that when pressure is applied to the arm, it contacts the agitator device at some point and moves it in one direction, and when pressure is released, the device moves in the other direction. In one embodiment, such an arm may be a button projecting out of the cover on the container and connected to a rod and flange which extend downwardly through the cover to a position just above the agitator device. Downward pressure on the button causes the flange to contact the agitator device and move it down, while release of the button allows the device to float upwardly. In another embodiment, a lever arm is positioned outside of the container but positioned to contact the lower plate of the agitator device. Oscillating movement of the lever arm results in an upward and downward movement of the agitator device.

The tank apparatuus of the invention is simple to work with. A plurality of chemical solutions are placed in vessels. The film is loaded into the container and then the container is manually immersed in the first vessel. The solution flows upwardly into the container through the opening at the outer edge of the lower plate. The film is then agitated by the movement of the agitating device on which it rides. The container is then lifted out of the vessel and the solution flows out of the bottom opening. The cycle is then repeated in the next vessel. Finally, a water bath is applied to the film by inverting the vessel and forcing water through the bottom opening and out of the several air openings in the cover.

DESCRIPTION OF THE DRAWINGS

The above objects, features and advantages of the present invention will become more readily apparent from the following description, taken in conjunction with the accompanying drawings, in which.

Figure 1:
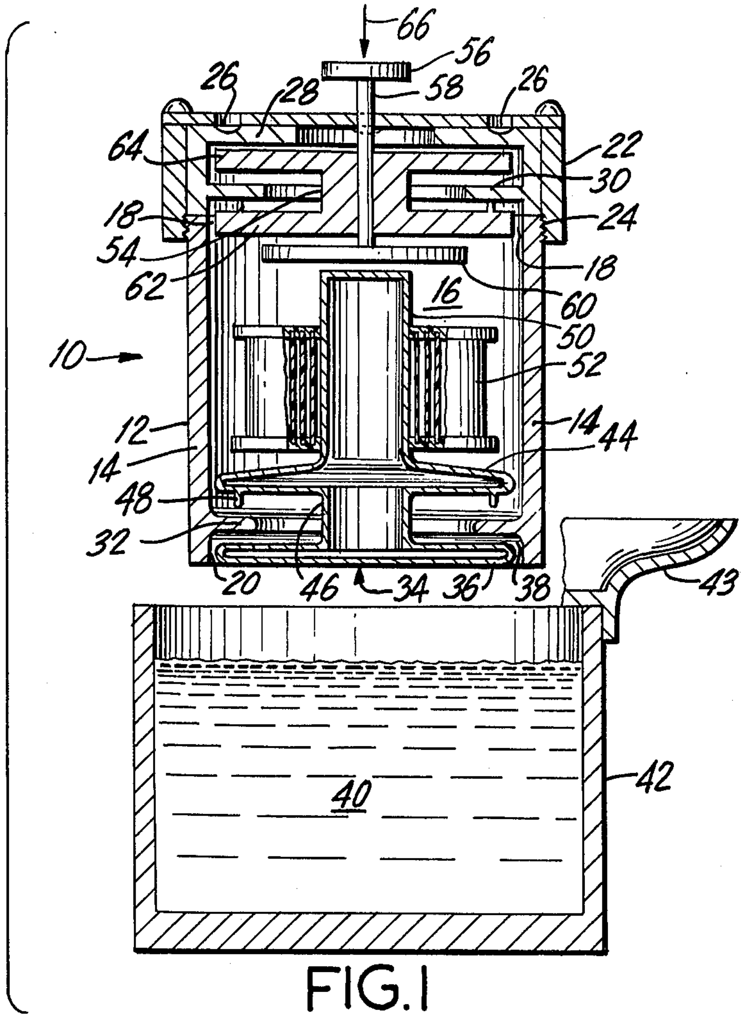
FIG. 1 is a front elevational, cross sectional view of the tank apparatus of the invention just prior to immersion in a vessel containing developing solution.

Referring now to the drawings, and specifically FIG. 1, one embodiment of the tank apparatus of the invention is generally illustrated by the numeral 10. The apparatus 10 includes a container 12 with a wall 14 which forms an enclosure and defines an inner space 16. The container 12 may be cylindrical as shown or rectangular or any other suitable shape, and is provided with an upper opening 18 and a lower opening 20. A cover 22 is suitably connected to container 12 by means such as threads 24 and is provided with a plurality of air openings 26. Flanges 28 and 30 project inwardly from cover 22 to provide baffles for light entering the air openings 26 and thereby prohibit light from reaching interior space 16. Similarly, a light baffle ring 32 is positioned at the lower portion of container 12 just above opening 20 to also interrupt entrance of light.

Positioned within container 12 in space 16 at the lower portion thereof is a floating agitator device depicted generally by the numeral 34. This device consists of a lower plate 36 positioned to cover most of opening 20. This plate is almost as wide as the width or diameter of container 12, but forms an opening 38 with the container wall 14 near the periphery of plate 36. This opening 38 permits upward flow of chemical solution 40 into space 16 when apparatus 10 is immersed into a vessel such as shown by numeral 42. Basin 43 may be attached to vessel 42 to contain chemical solution 40 when apparatus 10 is submerged. The outer edge of plate 36 also acts as a light baffle and together with annular ring 32 prevent light from entering space 16. Spaced from plate 36 is another upper plate 44 which is similar in configuration and is connected to plate 36 by part 46. Depending from plate 44 is spacer lug 48 which not only reduces the distance between upper plate 44 and lower plate 36, but also permits free flow of solutions from space 16. The distance between these plates is the amount the agitator device 34 will travel when activated as hereinafter further explained. The agitator device also includes an elongated member 50 which here acts in effect, as a spindle for holding the reel of film 52.

As illustrated in FIG. 1, the agitator device 34 floats within container 12 in space 16. When being immersed in bath 40, the pressure of the bath passing through opening 38 and on the bottom of plate 36 tends to force the device 34 to rise to a position at which plate 36 would abut against light baffle ring 32. However, such action would prevent free flow of the solution into space 16. Therefore, a mechanism is provided to maintain the agitator device in a position which permits continued flow of solution into the container while the container is being submerged in the solution. To this end, a depressor assembly 54 consists of a button 56, a rod 58 and a flange member 60 pass through baffle discs 62 and 64. Pressure in the direction of arrow 66 will be transmitted to flange member 60 which will engage elongated member 50 and force agitator device 34 downwardly until spacer lug 48 engages baffle ring 32. However, such action would prevent free flow of solutions. Therefore, depression of button 56 would force the floating agitator 34 downward. Spacer lug 48 would come in contact with light baffle ring 32 maintaining a free flow of solutions through opening 20. After space 16 has filled, button 56 is released permitting the floating agitator 34 to ascend. The cycle of pressing and then releasing button 56 may thereafter be repeated. In this way, agitation of the film is achieved rapidly and effectively without chemical splash external to container 12. When sufficient time has elapsed, the apparatus 10 is removed from vessel 42 and immersed in a second chemical solution (not shown); and the agitation cycle is repeated. The solution 40 flows out of the bottom opening 38 each time the container is withdrawn from a vessel. This simple and efficient structure enables agitation to be carried out without the need of vigorous manual shaking of the container as is often done with present equipment. It also avoids the need for circulating sprays and other similar expensive attachments.

Figure 2:
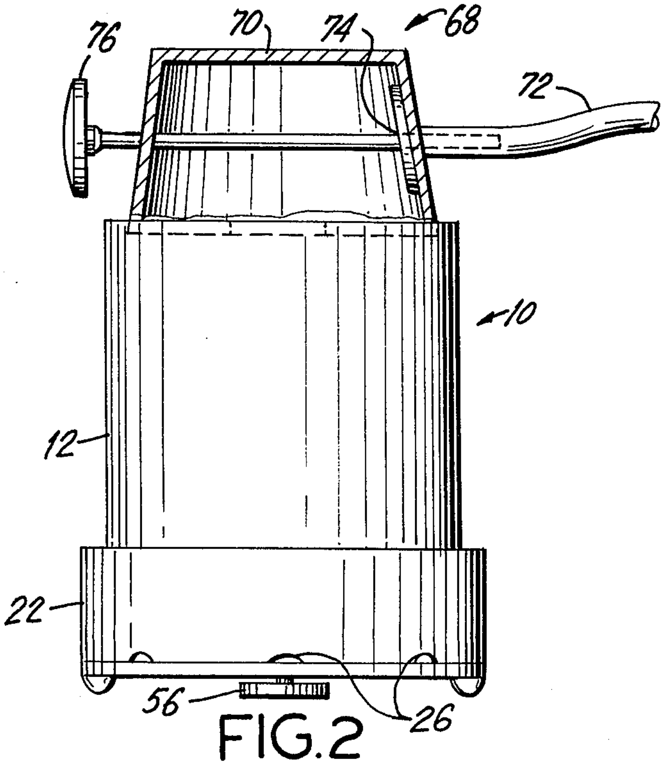
FIG. 2 is a front elevational view of the apparatus of FIG. 1 in an inverted position with a water bath mechanism attached.

Once the film has been processed through all of the chemical solutions as above described the film must be washed by a water solution at a suitable temperature. This is readily accomplished by the apparatus shown in FIG. 2. As illustrated in FIG. 2, the apparatus 10 of FIG. 1 is inverted and a washing cone 68 is connected to it. The washing cone 68 comprises an enclosed cap 70 which snap fits into container 12 between the inner portions of wall 14. A hose 72 connects to a sink faucet (not shown) and water flows from the faucet through points 74 into cap 70 and through opening 38 th the interior of apparatus 10. A thermometer 76 measures the temperature of the water to ensure that the film is not damaged. The washing water flows out of apparatus 10 through openings 26. After washing is complete, the cover 22 is removed and the processed film is taken out of the apparatus 10 to dry.

Figure 3:
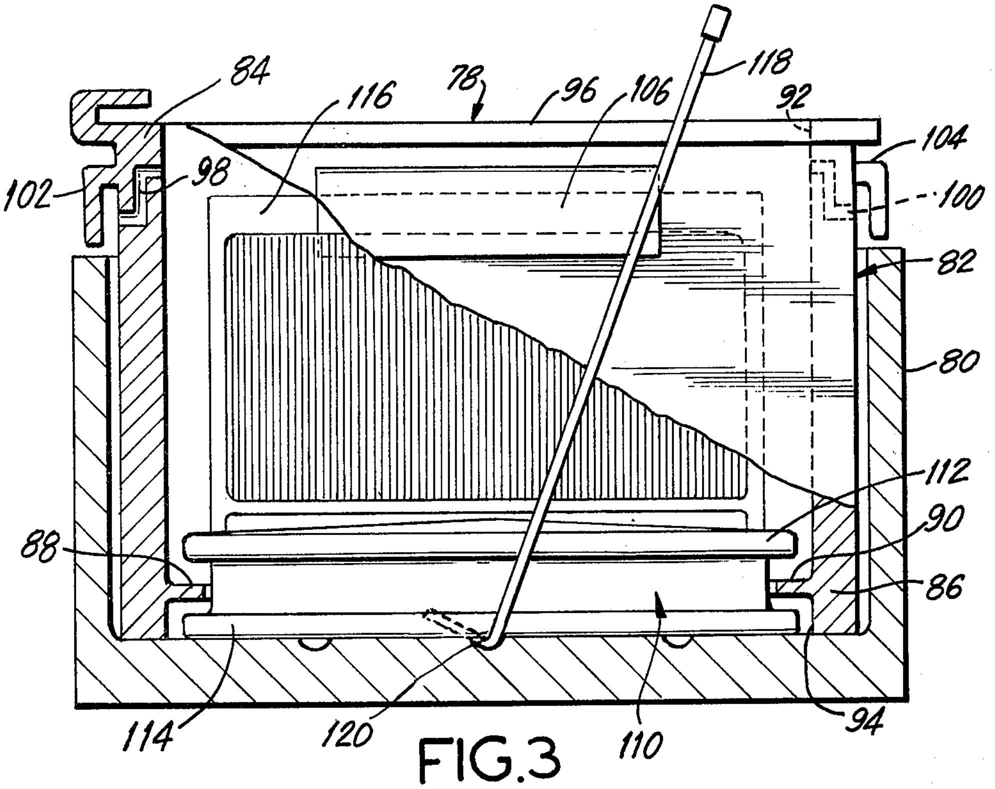
FIG. 3 is a front elevational view, partially in cross section of another embodiment of the tank apparatus of the invention.
Figure 4:
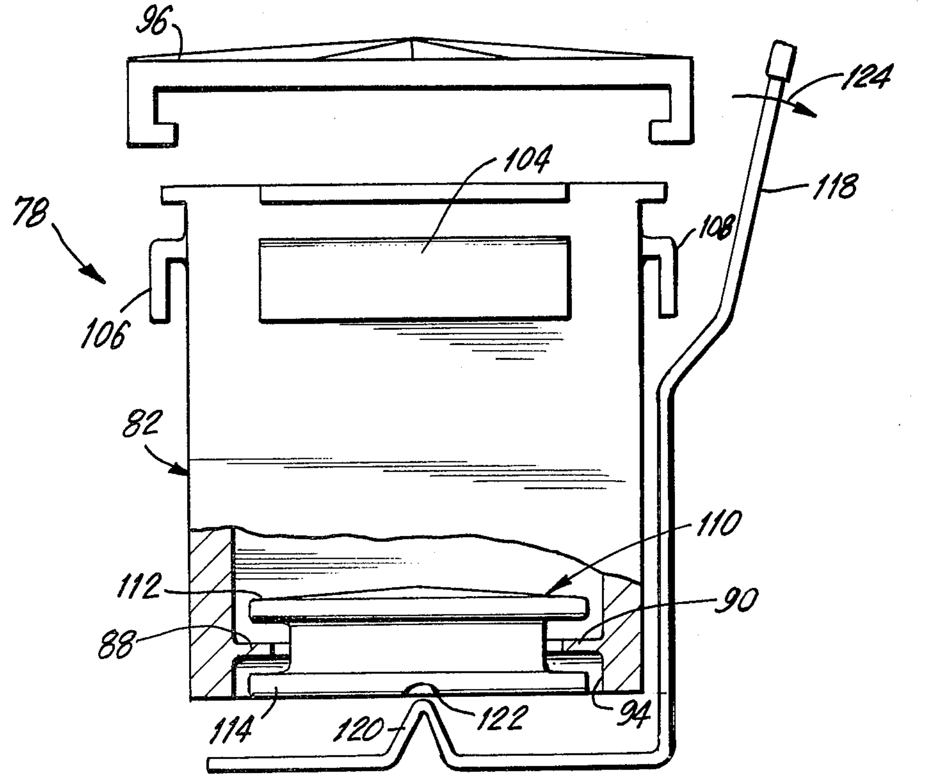
FIG. 4 is a side elevational view, partly broken away, of the apparatus of FIG. 3 illustrating another embodiment of an agitator arm.

The apparatus of the invention may be modified in many ways to accommodate various kinds of films to be developed. One example of such a variation may be discussed with reference to FIGS. 3 and 4 of the drawings. In FIG. 3, a tank apparatus 78 is shown positioned within a vessel 80 containing a chemical solution. The apparatus 78 includes a rectangular container 82 having walls such as 84 and 86. The lower inner portion of the walls are equipped with baffles 88 and 90. The container 82 has an upper opening 92 and a lower opening 94. The upper opening 92 is closed by a cover 96 (best shown in FIG. 4) which slidably engages container 82 in a dovetail engagement. The side walls 84 and 86 are provided with air openings such as 98 and 100 which are protected by baffles 102, 104, 106 and 108 from penetration by light.

The floating agitator device 110 (FIGS. 3 and 4) comprises upper plate 112 and lower plate 114 positioned on either side of baffles 88 and 90. Positioned on top of plate 112 is a basket 116 which holds any number of films of varying sizes and shapes including plates, discs and rolls. The basket is pervious to fluid, thus allowing the chemical solution to flow over the film. This type of construction allows for processing of multiple films simultaneously. Because the agitator device 110 is weighted down by the basket 116, it has a tendency to gravitate toward lower opening 94 despite the force of the chemical solution. Thus an agitation assembly 118 in the form of an elongated lever arm positioned outside of container 82 is employed to move the agitator device 110 and basket 116. The lever arm 118 is equipped with an inverted V shaped notch 120 which fits into groove 122 in the device 110. Motion of the lever arm 118 in the direction of arrow 124 causes the floating agitator device and basket to rise and release thereof results in these pieces falling back to their original position. In this way, agitation of the film while in solution is readily accomplished.

While the apparatus of the invention has been described with reference to specific embodiments, it is apparent that other modifications may be made without departing from the spirit of the invention. For example, the agitation may be accomplished by other pressure activating means such as mechanical arms connected through gears to the floating agitator. In addition, the container may assume any number of shapes and sizes designed to accommodate various types of film. Also, the water bath may be applied without inverting the tank by means of inlet hose pressure at the lower part of the container. What is significant in the subject invention is that the apparatus is simple, inexpensive to manufacture and very efficient to operate.

What is claimed is:

1. A tank apparatus for use in processing photographic material, such apparatus being adapted, during such processing, to be submerged by moving said apparatus in a vertical direction downwardly into one or more vessels containing a chemical solution used to process such film comprising, in combination, (a) container means for housing the photographic material during such processing, said container means having at least one opening for receiving a chemical solution in the interior portion thereof to contact the photographic material housed therein, said opening being positioned at that portion of said container means which is first placed in a chemical solution held in a vessel;

(b) floating agitator means operatively positioned within said container means and effective to carry said photographic material during processing, said agitator means being positioned to reciprocally move between a first position and a second position within said container upon the application of a force said first position being located adjacent said opening in said container means and said second position being located vertically and linearly displaced from said first position;

(c) limiting means operatively connected to said container means and effective to limit the movement of said agitator means between said first and second positions, whereby the movement of said agitator means is substantially limited within a vertical plane essentially parallel to the direction followed when submerging said container means into a vessel;

(d) force activating means operatively connected to said agitator means and effective when actuated to move said agitator means between said first and second positions thereby moving said photographic material within said chemical solution contained within said container means said agitator means being unattached to said container means and to said force activating means, thereby being freely floating within said container means when filled with a chemical solution, whereby said photographic material may be reciprocally moved by activation of said floating means or by vertical movement of said container means in said solution.

2. The tank apparatus of claim 1, in which said limiting means is positioned proximate said opening and extends partially over said opening to inhibit light penetrating to the interior of said container means.

3. The tank apparatus of claim 2, in which said floating agitator means has a lower plate positioned immediately adjacent said opening within said container means, said lower plate having a surface area which is configured to cover said opening except at the periphery of said lower plate, whereby said chemical solution can enter the interior of said container means at the periphery of said lower plate.

4. The tank apparatus of claim 3, in which said floating agitator means comprises said lower plate, an upper plate operatively connected to said lower plate and spaced therefrom, and carrying means operatively connected to said upper and lower plates and effective to carry a photographic material within said container means, said upper and lower plates being structured to engage said limiting means alternatively to thereby terminate the motion of said agitator means at said first and second positions respectively.

5. The tank apparatus of claim 4, in which said force activating means comprises a movable first member accessible from the exterior of said container means and extending to the interior of said container means, a second member operatively connected to said first member and effective to engage said agitator means, whereby a force applied to said first member will be transmitted to said agitator means through said second member.

6. The apparatus of claim 4, in which said limiting means consists of a baffle member connected to the inside wall of said container and projecting inwardly of said container partially toward the center thereof, said baffle member being positioned between said upper and lower plates and extending a distance sufficient to alternately engage said upper and lower plates when said agitator means is in said first and second position.

* * * * *